A. McLEOD.
SHEAF LOADER.
APPLICATION FILED APR. 8, 1912.
1,077,888.
Patented Nov. 4, 1913.
3 SHEETS—SHEET 2.
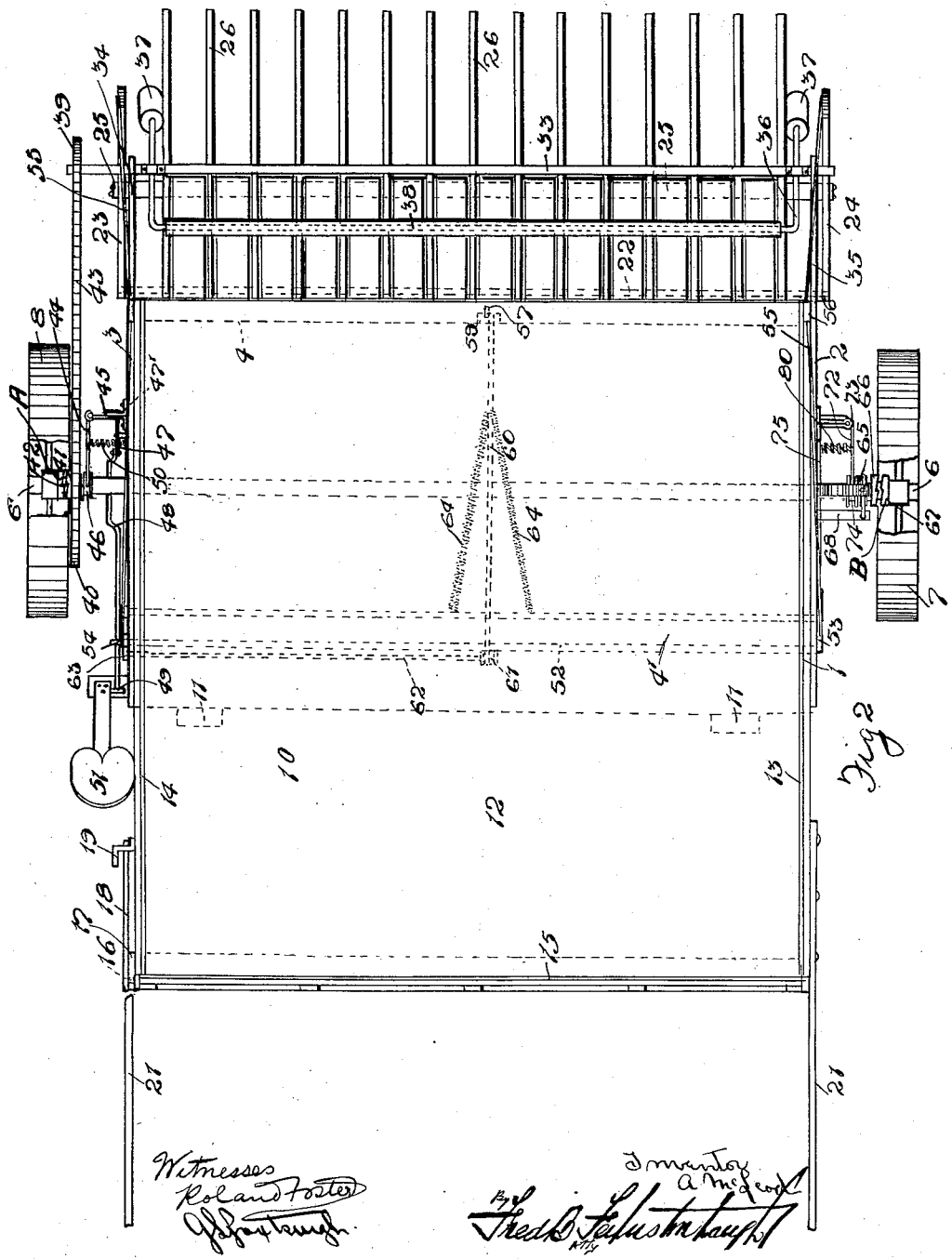

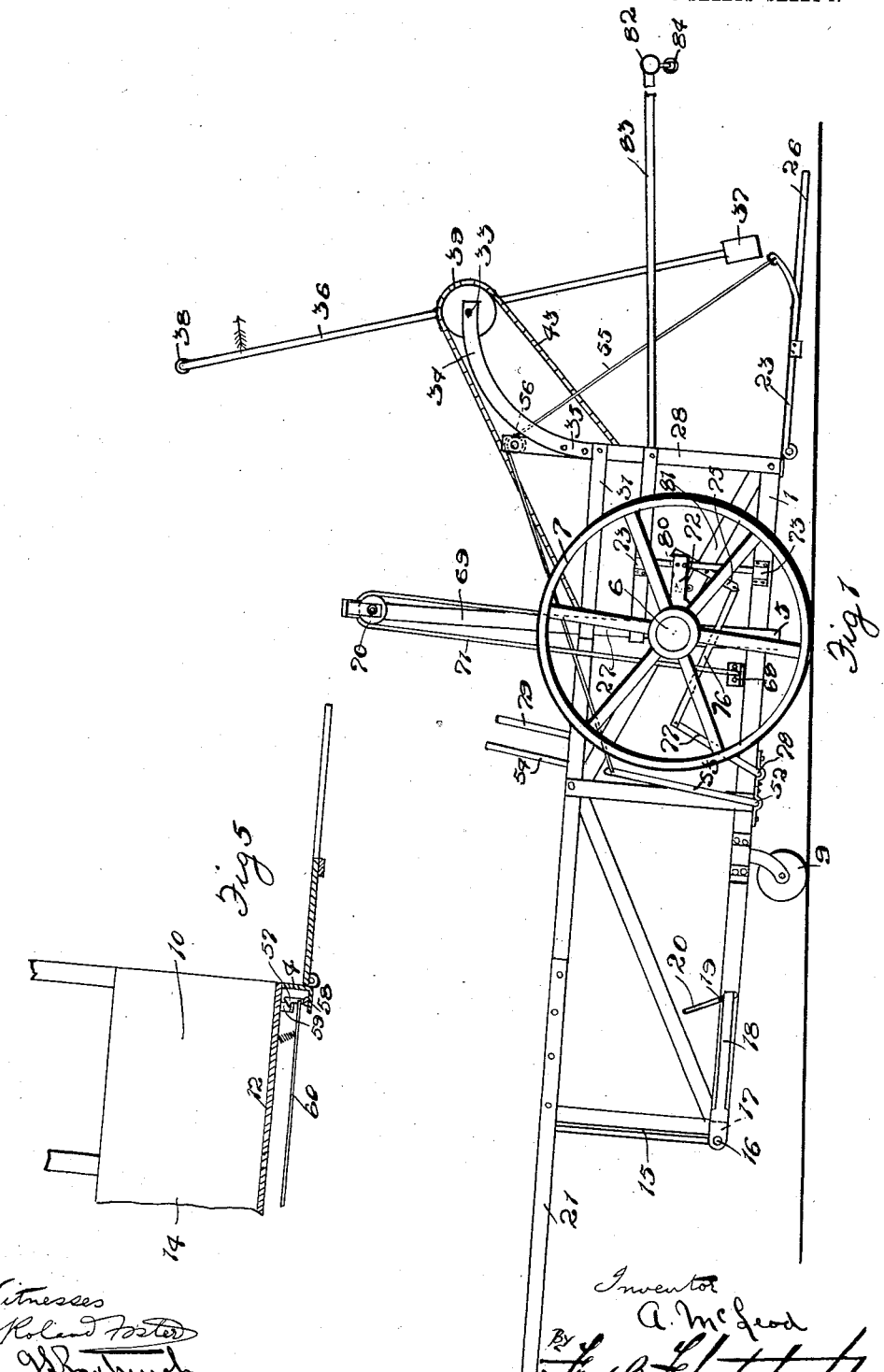

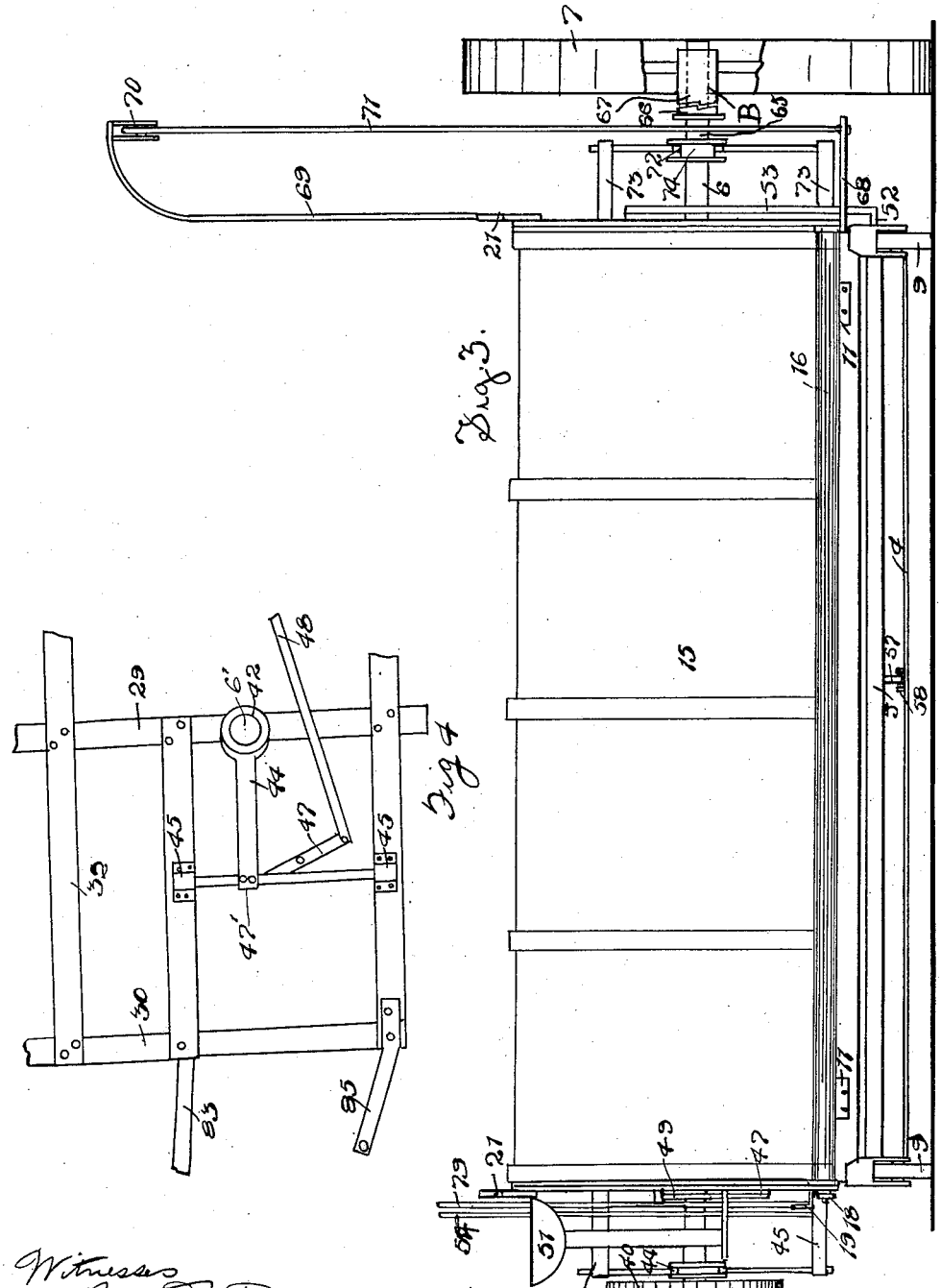

UNITED STATES PATENT OFFICE.

ALEXANDER McLEOD, OF WINNIPEG, MANITOBA, CANADA.

SHEAF-LOADER.

1,077,888.   Specification of Letters Patent.   Patented Nov. 4, 1913.

Application filed April 8, 1912. Serial No. 689,335.

*To all whom it may concern:*

Be it known that I, ALEXANDER MCLEOD, of the city of Winnipeg, in the Province of Manitoba, Canada, have invented certain new and useful Improvements in Sheaf-Loaders, of which the following is the specification.

My invention relates to machines for the collection of sheaves or the like. mechanically placing them in a convenient receptacle in such a manner that little or no grain is lost during the operation.

This and other objects I obtain by the novel construction and arrangement of parts as shown in the accompanying drawings in which:—

Figure 1 is a side elevation of the complete machine. Fig. 2 is a top plan view of the same. Fig. 3 is an enlarged rear elevation. Fig. 4 is a view of the operating mechanism of the clutch A. Fig. 5 is a section showing the locking mechanism of the box 10.

The main frame 1 is composed of side pieces 2 and 3 and front and rear cross pieces 4 and 4' and is supported by the drop axle 5 carrying upon stub shafts 6 and 6' the wheels 7 and 8 and by caster wheels 9 mounted under the rear of the side pieces 2 and 3.

Attached by bearings to the forward end of the frame 1 is a cross shaft 22 fitted at the ends with forwardly extending arms 23 and 24 which are adapted to turn said shaft. A cross bar 25 is permanently secured to the arms in a closure of the shaft, said cross bar having fingers or sweeps 26 having their rear ends freely swung on the shaft 22. Attached to the arms 23 and 24 are flexible connections 55 which pass up and over pulleys 56 attached to the upper ends of uprights 28 and 30 thence downwardly and rearwardly, one to the crank 53 formed by the upturning of one end of the cross shaft 52 carried by bearings on the under side of frame 1, the other to the actuating lever 54 attached to the other end of the shaft 52. It will be seen that when the lever 54 is actuated as from the seat 51, the fingers 26 are raised. Attached to the upright 28 at 35 are the hangers 34 supporting the rotatable shaft 33. The shaft carries a gatherer 36 constructed from a rod bent to form an open-sided rectangle. The ends carry weights 37 and the cross piece the roller 38. The cross shaft together with the gatherer are rotated by means of a sprocket 39 on the end of the shaft 33 which is driven by the chain 43 which is in turn driven by the large sprocket wheel 40 freely mounted on the stub shaft 6' and provided with a female member of the clutch A the male member of which is fixed to the hub of the wheel 8. Means for shifting the sprocket 40 are provided in the pivoted bell crank lever 44, carried by a pair of brackets 45, which engages a channel 46 on the inside of the sprocket 40. The clutch A is held normally open by the spring 50 connected to the lever 44 and to an angularly disposed brace rod between the uprights 29 and 30. A pivoted lever 47 connected to the free end of the bell crank and attached to the slidably mounted trip rod 48 terminating at the end in the foot piece 49 affords means for operating the bell crank. A receiving box 10 having a bottom 12, a rear gate 15, upright sides 13 and 14 and an open front end. The gate 15 is carried by a cross shaft 16 mounted in brackets 17 secured to the bottom of the receiving box and is held closed by an arm 18 which arm is engaged and held in position by a pivoted crank 19 fitted with an extended handle 20. Hand pieces 21 secured permanently to the box and extending rearwardly therefrom are utilized to return the box to position after being dumped as described below.

The means for dumping the box comprise a drum 65 loosely mounted on the stub shaft 6 and provided with a female member 66 of the clutch B adapted to engage with a male member 67 attached to the hub of the supporting wheel 7. Attached to the drum 65 is a cable 71 passing upwardly and over a pulley 70 carried by the arm 69 attached to the upright 27. From the pulley the cable passes down and is attached to an anchor bar 68. Means is provided for throwing the clutch B, which is normally held out of position by the spring 80, passing between the bell crank and an angularly disposed bracing bar 81, into engagement, comprising the bell crank 72 and bracket 73 similar to those described in clutch A. The bell crank has one end forked which end enters the channel 74 located at the inner end of the drum. A pivoted lever 75 has the upper end connected to the bell crank and the lower end pinned to a link 76 connected to the cranked end 77 of a cross shaft 78 rotatably mounted in bearings carried by the under side of the frame.

The cross shaft is fitted with a lever 79 located within convenient range of the driver's seat.

The construction just described allows the driver to upset the box himself without the help of an attendant. It will be seen that once the clutch B is engaged the drum will wind on the stub shaft and cause the cable to pull up on the anchored arm with the result that the receiving box is dumped backwardly.

By means of a catch 57 pivotally secured at 58 to the main frame adapted to engage with a plate or bracket 59 the box is locked into position. Means for unlocking or releasing the box comprise a link 60 connected to the catch piece 57 above the pivot point and passing rearwardly to the lower end of a downturned crank 61 at one end of a cross rod 62 rotatably mounted in bearings carried by the cross member 4' supplied at the opposite end with the lever 63 adjoining the seat. By means of springs 64 passing between the rear end of the hub 60 and the cross member 4' of the frame the upper end of the catch piece is kept normally back so that it will automatically engage with and catch the bracket when the receiving box returns to place after being dumped.

The traction means consist of a cross rod 82 held somewhat in advance of the fingers by the supporting bar 83 secured permanently to the uprights 27, 28, 29 and 30. The draft animals are hitched on the outer sides of the bars 83 between rings on the cross bar 82 and draft bars 85 extending outwardly from the sides of the main frame.

When the machine is in use, the sheaves are initially picked up by the fingers and are slid, as the machine advances toward the box, although they may not be initially delivered to the box. If not the driver throws the clutch A so that the gatherer turns and pushes the sheaves back into the box, the roller 38 engaging them about the center or slightly below. After a load has been collected the machine is driven to the place where it is to be unloaded the driver previously raising the forks by means of the lever 54 so that they will clear the field. Arriving at the point where the load is to be dumped the attendant grasps the hold piece 20 and releases the crank from the bar 18 which allows the gate to swing open. The driver then releases the catch piece 57 and the attendant immediately dumps the load by pressing down on the hand pieces 21. If desired the driver can dump the load by throwing the clutch B when the machine is still in motion. As the driver returns for a new load the attendant throws up and locks the gate closed.

What I claim as my invention is;—

1. The combination with a main frame adapted to be drawn along the ground, and fingers or sweeps carried by the front of the frame and adapted to pick up material off the ground, of a receiving box pivotally secured to the frame having the forward end arranged to receive material passed over the fingers, and the rear end open, and a releasable gate normally closing the rear end of the box, as and for the purpose specified.

2. The combination with a main frame mounted on a suitable carriage and caster wheels and a receiving box pivotally secured to the frame and arranged to dump rearwardly, of means actuated by one of the carriage wheels for automatically dumping the box, as and for the purpose specified.

3. The combination with a main frame mounted on a suitable carriage and caster wheels and a receiving box pivotally secured to the frame and arranged to dump rearwardly, of a rotatable drum adjoining one of the carriage wheels, engageable clutch members carried by the drum and the carriage wheel, means for engaging the clutch members, a pulley suspended above the frame and free of the box, and a cable secured to the drum and to the box passing over the pulley, as and for the purpose specified.

4. The combination with a normally inclined main frame mounted forwardly on carriage wheels and rearwardly on caster wheels, and a forwardly inclined receiving box carried by the frame and pivotally secured to the same, of a bracket located on the under side of the box at the front, a pivoted spring pressed catch piece carried by the frame and normally engaging the bracket thereby locking the receiving box to the frame and means controlled by a lever for releasing the catch piece from the bracket to free the box to dump, as and for the purpose specified.

Signed at Winnipeg, this 15th day of March 1912.

ALEXANDER McLEOD.

In the presence of—
G. S. ROXBURGH,
E. BELSHAM.